United States Patent Office 2,808,417
Patented Oct. 1, 1957

2,808,417
STABILIZED FATTY COMPOSITIONS

Clarence E. Tholstrup, Kingsport, Tenn., assignor to Eastman Kodak Company, Rochester, N. Y., a corporation of New Jersey No Drawing. Application February 8, 1955, Serial No. 486,975

5 Claims. (Cl. 260—398.5)

This invention relates to the stabilization of organic materials which are normally subject to oxidative deterioration and is particularly concerned with stabilized organic compositions such as stabilized fats and fatty oils.

A large number of organic materials including fats, fatty oils, and hydrocarbons such as gasoline, polyethylene and the like are normally subject to the deleterious effects of oxidation upon storage. As a consequence, it is usually desirable to incorporate in such oxidizable materials a small amount of a stabilizing material which is effective to reduce the oxidation to an unobjectionable level.

It is accordingly an object of this invention to provide new and improved stabilized compositions containing as a stabilizer materials which have not been employed heretofore as antioxidants and which have unexpectedly high antioxidant potency.

Another object of the invention is to stabilize normally oxidizable materials such as fats, fatty oils, and hydrocarbons against objectionable oxidation by the incorporation therein of a new and highly effective antioxidant material.

Another object of the invention is to facilitate the storage of material which are normally subject to the deleterious effects of oxidation by providing a highly effective class of substituted pyrasolidone stabilizers.

Other objects will be apparent from the description and claims which follow.

These and other objects are attained by means of this invention wherein organic materials which are normally subject to objectionable oxidation are stabilized by incorporating therein certain substituted pyrazolidones as defined hereinafter. The stabilizers embodying the invention all have the common structure of a phenyl group attached to a nitrogen atom of a pyrazolidone nucleus. Such materials have been known for many years, but their antioxidant activity has not been recognized heretofore. These compounds have found use largely in photographic developers, and no other use was known. As described in U. S. Patent 2,458,780, certain of the pyrazolones have been used as stabilizers for oxidizable materials, but, as will appear hereinafter, the compounds employed in practicing this invention have an unexpectedly higher antioxidant potency than do the pyrazolones.

The antioxidants embodying the invention are as follows.

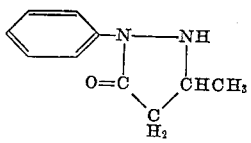

3-methyl-1-phenyl-5-pyrazolidone

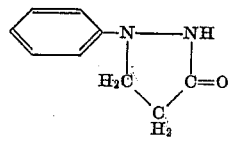

1-phenyl-3-pyrazolidone

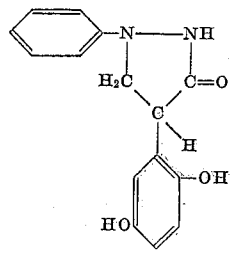

4-(2,5-dihydroxyphenyl)-1-phenyl-3-pyrazolidone

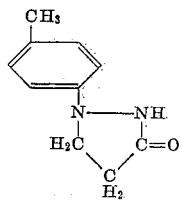

1-(p-tolyl)-3-pyrazolidone

As can be seen, the materials set out have closely related structures. I have found that relatively minor changes in the structure or in the substituent groups markedly change the antioxidant activity of these materials. Each of these materials is a highly effective stabilizer for organic materials normally subject to oxidative deterioration. The stabilizers can be used in relatively small amounts such as from 0.001% to 1.0% by weight. Preferably, the stabilizers are employed in an amount of from 0.005 to 0.5% by weight for optimum results. Higher amounts, such as 1% or 2% or higher can be used, although such higher amounts are usually not necessary nor economical because of the relatively smaller gain in stability obtained with increasing amounts.

The materials which can be stabilized in accordance with this invention include any of the organic materials normally subject to oxidative deterioration. These include the hydrocarbons such as gasoline, fuel oils, polyethylene, rubber, and the like. The stabilizers are of particular utility in stabilizing fatty materials which include any of the fats or fatty oils normally subject to oxidation. Such fats and fatty oils include the free fatty acids such as oleic acid and the like, as well as the animal fats and vegetable oils. Thus, for example, the fatty materials include any of the triglyceride fats or glyceryl partial esters as typified by lard, tallow, cottonseed oil, peanut oil, corn oil, cocoanut oil, lard oil, monoglycerides of these and similar fatty materials, and similar well known fats and fatty oils.

The utility of the stabilizers embodying the invention in the stabilization of cottonseed oil is shown in Table 1. The stabilizing materials were employed in concentration of 0.02% by weight based on the weight of the material being stabilized, and the stabilizing activity was measured according to the Active Oxygen Method (AOM). In this method, the composition being tested is heated to a temperature of about 95–100° C. with air bubbling through the sample, and the buildup of peroxide in the compoistion is followed. The table sets out the number of hours required for formation of 70 milliequivalents of peroxide per kilogram of fatty material (meq./kg.). Item 2 of the table is included to illustrate the relatively lower effectiveness of the pyrazolone stabilizers as compared to the pyrazolidone stabilizers embodying this invention.

TABLE 1

*Stabilization of cottonseed oil*

| Additive | Hrs. To Peroxide Value | |
|---|---|---|
| | 70 meq./kg. | 100 meq./kg. |
| 1. Control | 12.0 | 14.0 |
| 2. 3-Methyl-1-phenyl-5-pyrazolone | 21.0 | 24.0 |
| 3. 3-Methyl-1-phenyl-5-pyrazolidone | 33.0 | 36.0 |
| 4. 1-Phenyl-3-pyrazolidone | 46.0 | 48.0 |
| 5. 4-(2,5-Dihydroxyphenyl)-1-phenyl-5-pyrazolidone | 37.0 | 40.0 |
| 6. 1-(p-Tolyl)-3-pyrazolidone | 41.0 | 44.0 |

Similar results are obtained in stabilizing other oxidizable materials. Thus, Table 2 shows the stabilization of peanut oil using 0.02% by weight of stabilizer in the Active Oxygen Method.

TABLE 2

*Stabilization of peanut oil*

| Additive | Hrs. To Peroxide Value | |
|---|---|---|
| | 70 meq./kg. | 100 meq./kg. |
| 1. Control | 19.0 | 21.0 |
| 2. 3-Methyl-1-phenyl-5-pyrazolone | 25.0 | 27.0 |
| 3. 3-Methyl-1-phenyl-5-pyrazolidone | 40.0 | 43.0 |
| 4. 1-Phenyl-3-pyrazolidone | 41.0 | 44.0 |
| 5. 4-(2,5-Dihydroxyphenyl)-1-phenyl-5-pyrazolidone | 75.0 | 77.0 |
| 6. 1-(p-Tolyl)-3-pyrazolidone | 42.0 | 45.0 |

One of the materials which requires stabilization in commercial practice is lard. Table 3 sets out data on the stabilization of three different samples of commercial lard. The number of hours necessary to reach a peroxide value of 20 are set out for each sample, as well as the Antioxidant Index (A. I.) compared to the well known stabilizer, butylated hydroxyanisole, which is assigned an Antioxidant Index of 1.0.

TABLE 3

*Stabilization of lard*

| Additive | Substrate 1 | | Substrate 2 | | Substrate 3 | |
|---|---|---|---|---|---|---|
| | Hrs. | A. I. | Hrs. | A. I. | Hrs. | A. I. |
| 1. Control | 8.0 | | 12.5 | | 7.0 | |
| 2. Butylated hydroxy anisole | 26.0 | 1.0 | 30.0 | 1.0 | 23.0 | 1.0 |
| 3. 3-Methyl-1-phenyl-5-pyrazolidone | 46.0 | 2.2 | | | 47.0 | 2.5 |
| 4. 1-Phenyl-3-pyrazolidone | | | 75.0 | 4.2 | 57.0 | 3.1 |
| 5. 4-(2,5-Dihydroxy-phenyl)-1-phenyl-5-pyrazolidone | 125.0 | 6.5 | | | 120.0 | 7.1 |
| 6. 1-(p-Tolyl)-3-pyrazolidone | 44.0 | 2.0 | | | 50.0 | 2.7 |

As can be seen from Table 3, the stabilizers of this invention have an Antioxidant Index in lard which ranges from more than twice that of butylated hydroxyanisole to more than 7 times the potency of butylated hydroxyanisole. Thus, the stabilizers of this invention can be used in much smaller amounts than any of the stabilizers employed heretofore, or, when used in the same amounts, give much higher stabilized action.

Thus, by means of this invention, oxidizable organic materials are readily stabilized by incorporating therein relatively minor amounts of highly effective stabilizing materials.

Although the invention has been described in detail with particular reference to preferred embodiments thereof, variations and modifications can be effected within the spirit and scope of the invention as described hereinabove and as defined in the appended claims.

I claim:

1. A fatty material from the class consisting of fats and oils subject to oxidative deterioration and containing a stabilizing amount of a compound from the group consisting of 3-methyl-1-phenyl-5-pyrazolidone, 1-phenyl-3-pyrazolidone, 4-(2,5-dihydroxyphenyl)-1-phenyl-3-pyrazolidone, and 1-(p-tolyl)-3-pyrazolidone.

2. A fatty material from the group consisting of fats and fatty oils subject to oxidation, containing 0.001 to 1.0% by weight of 3-methyl-1-phenyl-5-pyrazolidone.

3. A fatty material from the group consisting of fats and fatty oils subject to oxidation, containing 0.001 to 1.0% by weight of 1-phenyl-3-pyrazolidone.

4. A fatty material from the group consisting of fats and fatty oils subject to oxidation, containing 0.001 to 1.0% by weight of 4-(2,5-dihydroxyphenyl)-1-phenyl-3-pyrazolidone.

5. A fatty material from the group consisting of fats and fatty oils subject to oxidation, containing 0.001 to 1.0% by weight of 1-(p-tolyl)-3-pyrazolidone.

References Cited in the file of this patent

UNITED STATES PATENTS 2,458,780     Howland     Jan. 11, 1949